(12) United States Patent
Larzul

(10) Patent No.: US 11,748,623 B2
(45) Date of Patent: Sep. 5, 2023

(54) MODIFYING STRUCTURE OF ARTIFICIAL NEURAL NETWORKS BY COLLOCATING PARAMETERS

(71) Applicant: Mipsology SAS, Palaiseau (FR)

(72) Inventor: Ludovic Larzul, El Dorado Hills, CA (US)

(73) Assignee: Mipsology SAS, Palaiseau (FR)

( * ) Notice: Subject to any disclaimer, the term of this patent is extended or adjusted under 35 U.S.C. 154(b) by 475 days.

(21) Appl. No.: 16/848,973

(22) Filed: Apr. 15, 2020

(65) Prior Publication Data

US 2021/0326709 A1 Oct. 21, 2021

(51) Int. Cl.
*G06N 3/08* (2023.01)
*G06N 3/082* (2023.01)
*G06F 17/16* (2006.01)
*G06N 20/10* (2019.01)

(52) U.S. Cl.
CPC ............. *G06N 3/082* (2013.01); *G06F 17/16* (2013.01); *G06N 20/10* (2019.01)

(58) Field of Classification Search
CPC ................................ G06N 20/10; G06F 17/16
USPC .......................................................... 706/25
See application file for complete search history.

(56) References Cited

U.S. PATENT DOCUMENTS

| | | |
|---|---|---|
| 2019/0042923 A1 | 2/2019 | Janedula et al. |
| 2019/0065896 A1 | 2/2019 | Lee et al. |
| 2021/0182077 A1* | 6/2021 | Chen ...................... G06V 10/82 |

OTHER PUBLICATIONS

Maji, et al., "On the Reduction of Computational Complexity of Deep Convolutional Neural Networks", Entropy 2018, 20, 305 (Year: 2018).*

Mika et al., "Fisher Discriminant Analysis with Kernels", Neural Networks for Signal Processing IX: Proceedings of the 1999 IEEE Signal Processing Society Workshop, 1999 (Year: 1999).*

Di Huang et al.: "DWM: A Decomposable Winograd Method for Convolution Acceleration", Arxiv.org, Cornell University Library, 201 Olin Library Cornell University Ithaca, NY 14853, Feb. 3, 2020 (Feb. 3, 2020), XP081590037, abstract p. 2, col. 2, line 48-p. 5, col. 2, line 25.

(Continued)

*Primary Examiner* — Tsu-Chang Lee

(74) *Attorney, Agent, or Firm* — Georgiy L. Khayet

(57) ABSTRACT

Systems and methods for modifying a structure of an artificial neural network (ANN) are provided. An example method comprises receiving, by one or more processing units, a plurality of arrays of weights associated with the ANN, modifying, by the processing units, the plurality of arrays of weights to generate a further plurality of further arrays of weights, where after the modification the following conditions are satisfied: an amount of operations required for computing neurons of the ANN using the further plurality of further arrays of weights is less than an amount of operations required for computing same neurons of the ANN using the plurality of arrays of weights; and outputs of the neurons of the ANN computed using the plurality of arrays of weights are substantially equal to further outputs of the neurons of the ANN using the further plurality of further arrays of weights.

20 Claims, 14 Drawing Sheets

(56) References Cited

OTHER PUBLICATIONS

Park Hyunsun et al: "Zero and data reuse-aware fast convolution for deep neural networks on GPU", 2016 International Conference on Hardware/Software Codesign and System Synthesis (CODES+ISSS), ACM, Oct. 2, 2016 (Oct. 2, 2016), pp. 1-10, XP033002570, [retrieved on Nov. 21, 2016] abstract; figures 1-5 p. 2, col. 2, line 20-p. 6, col. 2, line 38.

Yang Chen et al.: "WRA: A 2.2-to-6.3 TOPS Highly Unified Dynamically Reconfigurable Accelerator Using a Novel Winograd Decomposition Algorithm for Convolutional Neural Networks", IEEE Transactions on Circuits and Systems I: Regular Papers, IEEE, US, vol. 66, No. 9, Sep. 1, 2019 (Sep. 1, 2019), pp. 3480-3493, XP011743069, ISSN: 1549-8328, DOI: 10.1109/TCSI. 2019.2928682 [retrieved on Aug. 27, 2019] p. 3481, col. 2, line 20-p. 3489, col. 1, line 40 abstract; figures 1-23.

\* cited by examiner

MODIFYING STRUCTURE OF ARTIFICIAL NEURAL NETWORKS BY COLLOCATING PARAMETERS

TECHNICAL FIELD

The present disclosure relates generally to data processing and, more particularly, to a system and method for modifying structure of artificial neural networks.

BACKGROUND

Artificial Neural Networks (ANNs) are simplified and reduced models reproducing the behavior of human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, and each of the layers may include many neurons sharing similar functionality. The inputs of a layer may come from a previous layer, multiple previous layers, any other layers, or even the layer itself. Major architectures of ANNs include a Convolutional Neural Network (CNN), a Recurrent Neural Network (RNN), and a Long Term Short Memory (LTSM) network, but other architectures of ANNs can be developed for specific applications. While some operations have a natural sequence, for example, a layer depending on previous layers, most operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations. However, the GPUs are constraining the computations in long pipes implying latency and lack of reactivity. To deliver the maximum throughput, very large GPUs can be used, which may involve excessive power consumption, which is a typical issue of GPUs. Since the GPUs may require more power consumption for the computations of ANNs, the deployment of GPUs can be difficult.

To summarize, CPUs provide a very generic engine that can execute very few sequences of instructions with a minimum effort in terms of programming, but lack the power of computing for ANNs. The GPUs are slightly more parallel and require a larger effort of programming than CPUs, which can be hidden behind libraries with some performance costs but are not very suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have been focusing on a specific ANN or a subset of ANNs requiring modification of the ANN structure to fit into a specific limited accelerator or providing a basic functionality without solving the problem of computing ANNs on FPGAs globally. The computation scale is typically not considered for existing FPGA solutions, with much of the research being limited to a single or few computation engines, which could be replicated. The existing FPGA solutions do not solve the problem of massive data movement required at large scale for the actual ANNs involved in real industrial applications. The inputs to be computed with an ANN are typically provided by an artificial intelligence (AI) framework. Those programs are used by the AI community to develop new ANNs or global solutions based on ANNs. Furthermore, the FPGAs lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an example embodiment, a system for modifying structure of an ANN by collocating parameters is provided. The system may include one or more processing units. The processing units may receive a plurality of arrays of weights associated with the ANN. The processing units can modify the plurality of arrays of weights to generate a further plurality of further arrays of weights. The modification includes changing locations of weights in the arrays. The weights with changed locations may satisfy criteria for reducing the amount of operations involving the weights in computations of the ANN. Reducing the amount of computation of the ANN can include skipping operations involving the weights. Reducing the amount of computation of the ANN includes positioning the weights at the same position in the arrays to allow performance of operations involving the weights in a single computational cycle. After the modification, the following conditions are satisfied: 1) an amount of operations required for computing neurons of the ANN using the further plurality of further arrays of weights can be less than an amount of operations required for computing same neurons of the ANN using the plurality of arrays of weights and 2) outputs of the neurons of the ANN computed using the plurality of arrays of weights are substantially equal to further outputs of the neurons of the ANN computed using the further plurality of further arrays of weights.

The processing units can receive a plurality of input values for the ANN. The processing units perform computations of the neurons of the ANN based on the plurality of input values and the further plurality of further arrays of weights by performing the operations to obtain an output of the ANN.

The further plurality of the further arrays of weights include a series of weights such that: 1) the operations involving the series of weights and corresponding input values to the neurons are performed in a single computational cycle of computation of the ANN; and 2) each weight of the series of weights satisfies criteria for reducing the operations involving the weight in the computation of the ANN. Reducing the operations can include grouping multiple operations together during the computation of the ANN. Reduction of the operations may include skipping operations in the computations of the ANN. The processing units can determine that the weight satisfies the criteria by comparing the weight to one or more pre-determined reference values. For determining that an operation involving the weights can be skipped, the pre-determined reference values may be set to zero. The operations may include a multiplication or an addition.

The modification of the plurality of arrays of weights may include changing an order of arrays in the plurality of arrays of weights. The modification of the plurality of arrays of weights may include inserting at least one additional array of values between two arrays in the plurality of arrays of weights.

The modification of the plurality of arrays of weights may include splitting an array of the plurality of arrays of weights into a first array and at least one second array, where a size of the first array is less than a size of the array, and where the further plurality of further arrays of weights includes the first array.

The modification of the plurality of arrays of weights may include determining that each of the plurality of arrays of weights includes a subset of weights, where each of the subset of weights satisfies a criterion for skipping the weights from computation of the neurons of the ANN. Modifying each of the plurality of arrays of weights may include removing the subset of weights and realigning the rest of the weights in all the plurality of arrays.

The plurality of arrays of weights can be modified to decrease lengths of one of the following: sequences of zero weights located at a same position in subsequent arrays of weights in the plurality of arrays of weights or sequences of non-zero weights located at the same position in subsequent arrays of weights in the plurality of arrays of weights.

The processing units can generate an identifier related to an array of weights of the plurality of arrays of weights and associate the identifier with a weight from an array of weights in the further plurality of further arrays of weights. The processing units can identify, based on the identifier, an accumulator for accumulating a result of a multiplication between an input value and the weight of the array of the weights in the further plurality of arrays of weights.

The plurality of arrays may include kernels for calculating feature maps in a convolution.

According to another example embodiment, a method for modifying structure of an ANN is provided. The method may include receiving, by one or more processing units, a plurality of arrays of weights associated with the ANN. The method may allow modifying, by the one or more processing units, the plurality of arrays of weights to generate a further plurality of further arrays of weights. The modification includes changing locations of weights in arrays. The weights with changed locations satisfy criteria for reducing the amount of operations involving the weights in computation of ANN. Reducing the amount of computations of the ANN may include skipping operations involving the weight. After the modification, the following conditions are satisfied: 1) an amount of operations required for computing neurons of the ANN using the further plurality of further arrays of weights can be less than an amount of operations required for computing same neurons of the ANN using the plurality of arrays of weights and 2) outputs of the neurons of the ANN computed using the plurality of arrays of weights are substantially equal to further outputs of the neurons of the ANN using the further plurality of further arrays of weights.

The method may include receiving, by the one or more processing units, a plurality of input values for the ANN and performing, by the one or more processing units, computations of the neurons of the ANN based on the plurality of input values and the further plurality of further arrays of weights by performing the operations to obtain an output of the ANN.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
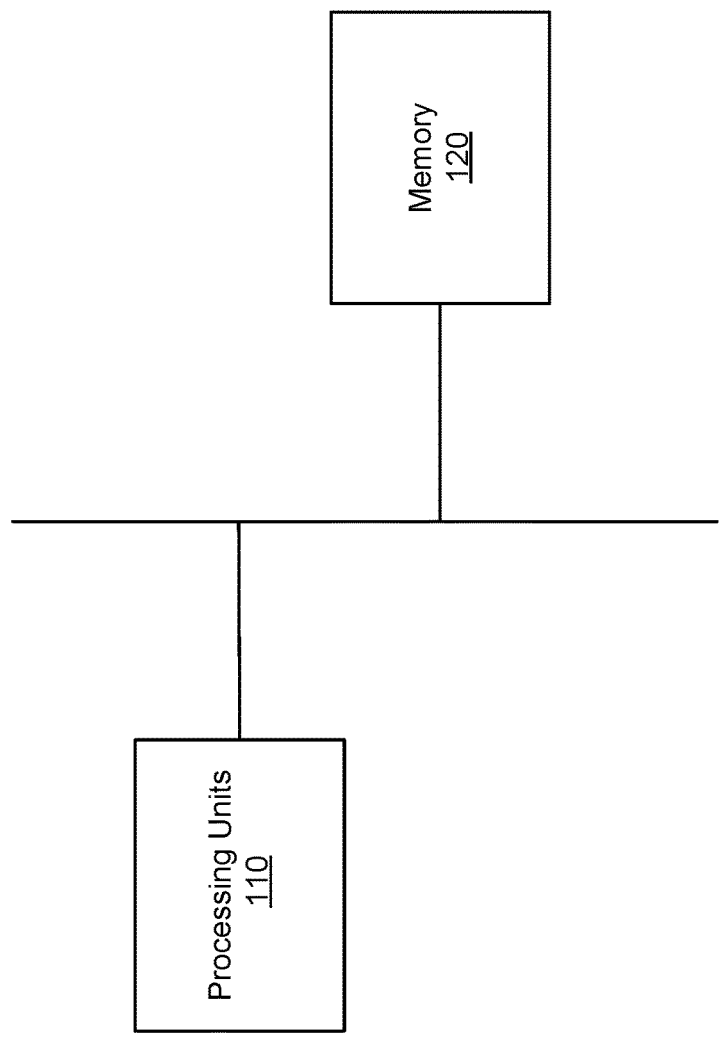
FIG. 1 is a block diagram showing an example system, in which a method for modifying a structure of ANNs by collocating parameters can be implemented, according to some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of the present disclosure can be implemented using integrated circuits, for example, CPU, GPU, application-specific integrated circuits (ASICs) or FPGAs. The present technology may be also practiced with programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, ASICs, programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, a "module" may also refer to a subpart of a computer system, a hardware device, an integrated circuit, or a computer program.

Embodiments of this disclosure are concerned with methods and systems for modifying a structure of ANNs. According to some example embodiments, a system for performing multiple ANN computations may include one or more processing units. The processing units may receive a plurality of arrays of weights associated with the ANN. The processing units may modify the plurality of arrays of weights to generate a further plurality of further arrays of weights. The modification includes changing locations of weights in the array. The weights with changed locations can satisfy criteria for reducing the amount of operations involving the weights in computations of the ANN. In one embodiment, reducing the amount of computation of the ANN includes skipping operations involving the weights in computation of the ANN. In another embodiment, reducing the amount of computations of the ANN includes locating the weights at the same position in the further arrays. After the modification the following conditions are satisfied: 1) an amount of operations required for computing neurons of the ANN using the further plurality of further arrays of weights is less than an amount of operations required for computing the same neurons of the ANN using the plurality of arrays of weights; and 2) outputs of the neurons of the ANN computed using the plurality of arrays of weights are substantially equal to further outputs of the neurons of the ANN using the further plurality of further arrays of weights.

The processing units may receive a plurality of input values for the ANN and perform computations of the neurons of the ANN based on the plurality of input values and the further plurality of further arrays of weights by performing the operations to obtain an output of the ANN. The further plurality of the further arrays of weights may include a series of weights such that: 1) the operations involving the series of weights and corresponding input values to the neurons are performed in a single computational cycle of computation of the ANN; 2) each weight of the series of weights satisfies criteria for reducing the operations involving the weight from the computation of the ANN.

Technical effects of certain embodiments of the present disclosure can include configuring integrated circuits, ASICs, CPUs, GPUs, FPGAs, or computer systems to perform ANN computations without execution of redundant and unnecessary operations or allowing an increase in a number of operations to be performed in parallel, thereby accelerating the ANN computations. Further technical effects of some embodiments of the present disclosure can facilitate configuration of integrated circuits, ASICs, CPUs, GPUs, FPGAs, or computer systems to dynamically qualify data on which operations are to be performed in the ANN computations.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 is a block diagram showing an example system 100 for modifying a structure of ANNs, according to some example embodiments. The system 100 can be part of a computing system, such as a personal computer, a server, a cloud-based computing recourse, and the like. The system 100 may include one or more processing unit(s) 110 and a memory 120. The memory 120 may include computer-readable instructions for execution by the processing unit(s) 110. The processing unit(s) 110 may include a programmable processor, such as a microcontroller, central processing unit (CPU), and so forth. In other embodiments, the processing unit(s) 110 may include an application-specific integrated circuit(s), such as a CPU or a GPU, or programmable logic array(s), such as an FPGA(s), designed to implement the functions performed by the system 100. In various embodiments, the system 100 may be installed on a remote server or may be provided via a cloud service residing in a cloud storage.

The processing unit(s) 110 may be configured to receive a plurality of arrays of weights associated with the ANN. The processing unit(s) 110 may modify the plurality of arrays of weights to generate a further plurality of further arrays of weights. After the modification, an amount of operations required for computing neurons of the ANN using the further plurality of further arrays of weights is less than an amount of operations required for computing the same neurons of the ANN using the plurality of arrays of weights. Additionally, after the modification, outputs of the neurons of the ANN computed using the plurality of arrays of weights are substantially equal to further outputs of the neurons of the ANN computed using the further plurality of further arrays of weights. The amount of operations refers to a total computational complexity of evaluation of neurons of the ANN. The computational complexity of the ANN may depend on a number of mathematical operations required to compute the neurons, computational complexity of the mathematical operations required to compute the neurons, a degree of parallelism that can be achieved in performing the operations of the neurons, and other computational complexity metrics.

Figure 2:
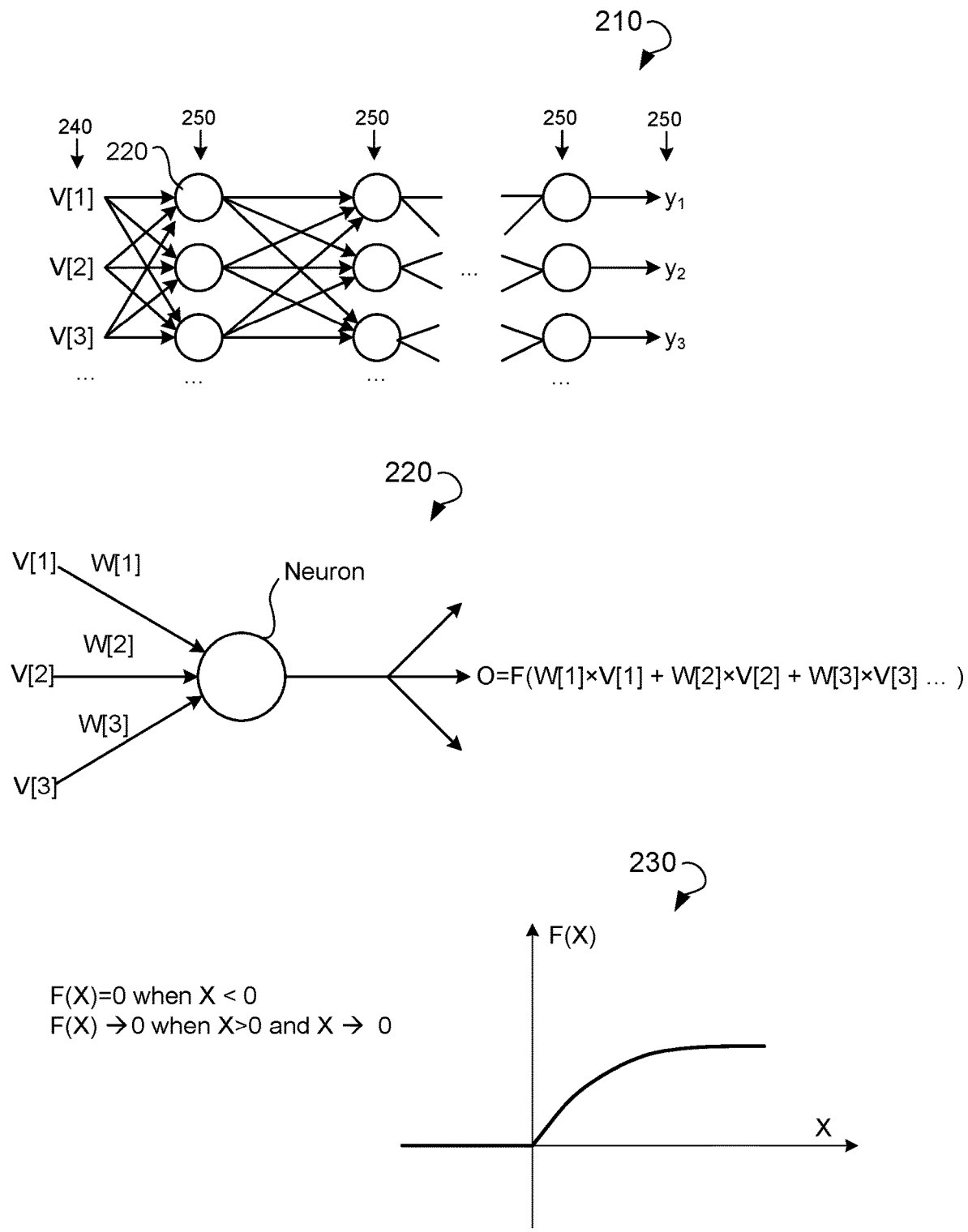
FIG. 2 shows an ANN, a neuron, and a transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers 240, hidden layers 250, and output layers 260 may include one or more (artificial) neurons 220. The number of neurons can be different for different layers.

Each of neurons 220 may represent a calculation of a mathematical function $$O = F\left(\sum_{i=1}^{n} V[i] \times W[i]\right) \quad (1)$$

where V[i] are neuron input values to a neuron, W[i] are weights assigned to input values to the neuron, and F(X) is a transfer function 230 (also referred as to an activation function). Typically, the transfer function 230 F(X) is selected to be zero for X<0 and have a limit of zero as X approaches zero. The transfer function F(X) can be linear, in the form of a sigmoid, binary step function, or other activation function used in ANN computations. The result of calculation of a neuron propagates as an input value of further neurons in the ANN. The further neurons can belong to either the next layer, the previous layer, or the same layer.

It should be noted that while the ANN 210 illustrated in FIG. 2 can be referred to as a feedforward neural network, embodiments of the present disclosure can be also used in computations of CNNs, recurrent neural networks, long short-term memory networks, and other types of ANNs.

Figure 3:
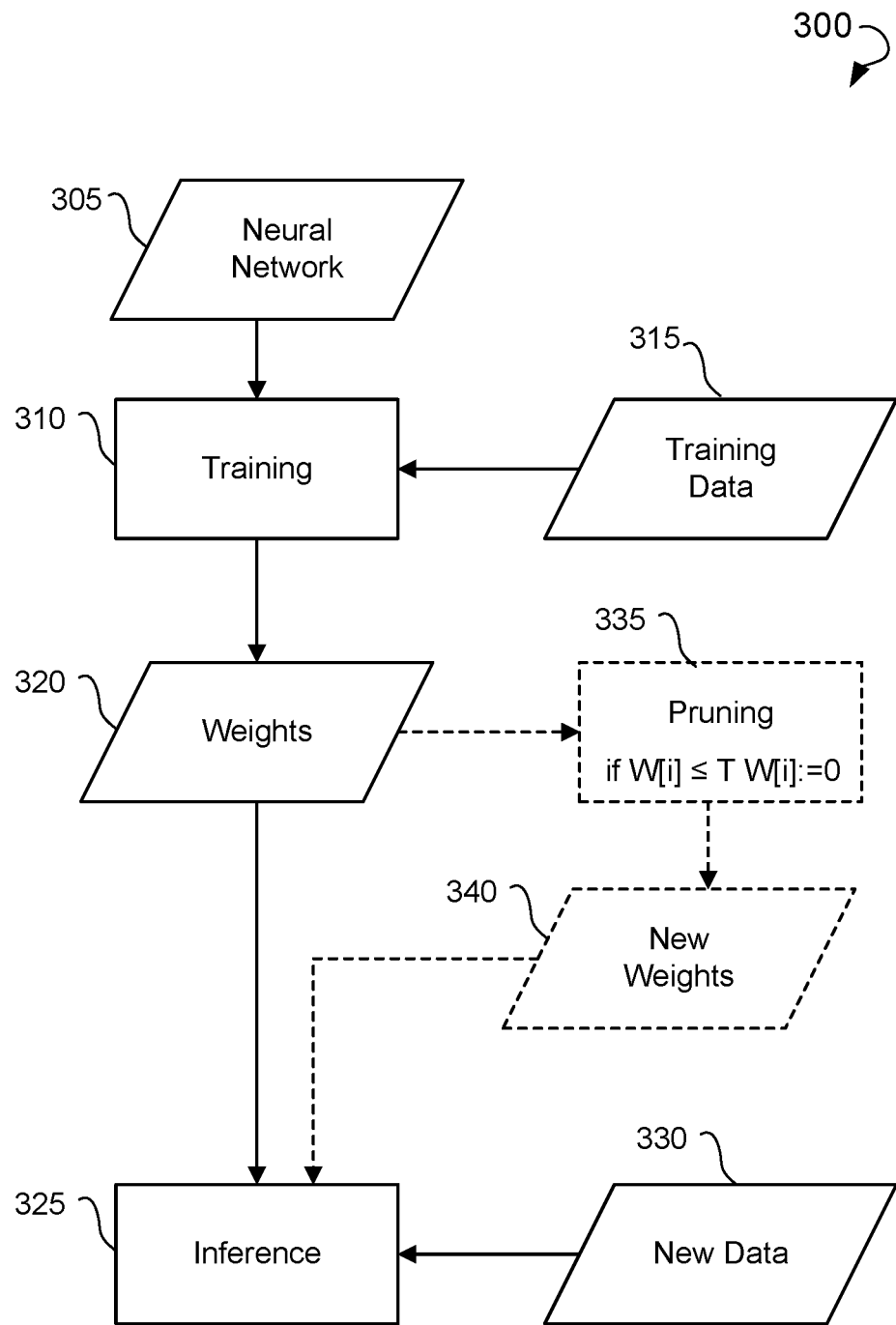
FIG. 3 is a flow chart showing training and inference of an ANN, according to some example embodiments.

FIG. 3 is a flow chart 300 showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output which answers the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, a number of inferences can be large because new images can be received from billions of sources.

The inference 325 includes multiple computations of sum of products:

$$\sum_{i=1}^{n} V[i] \times W[i] \quad (2)$$

where the V[i] are new input values to a neuron of ANN and W[i] are weights associated with the input values to the neuron. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. Replacing the weights with zero values may allow decreasing the number of computations of the ANN, since multiplications by zero can be avoided in computations.

Figure 4:
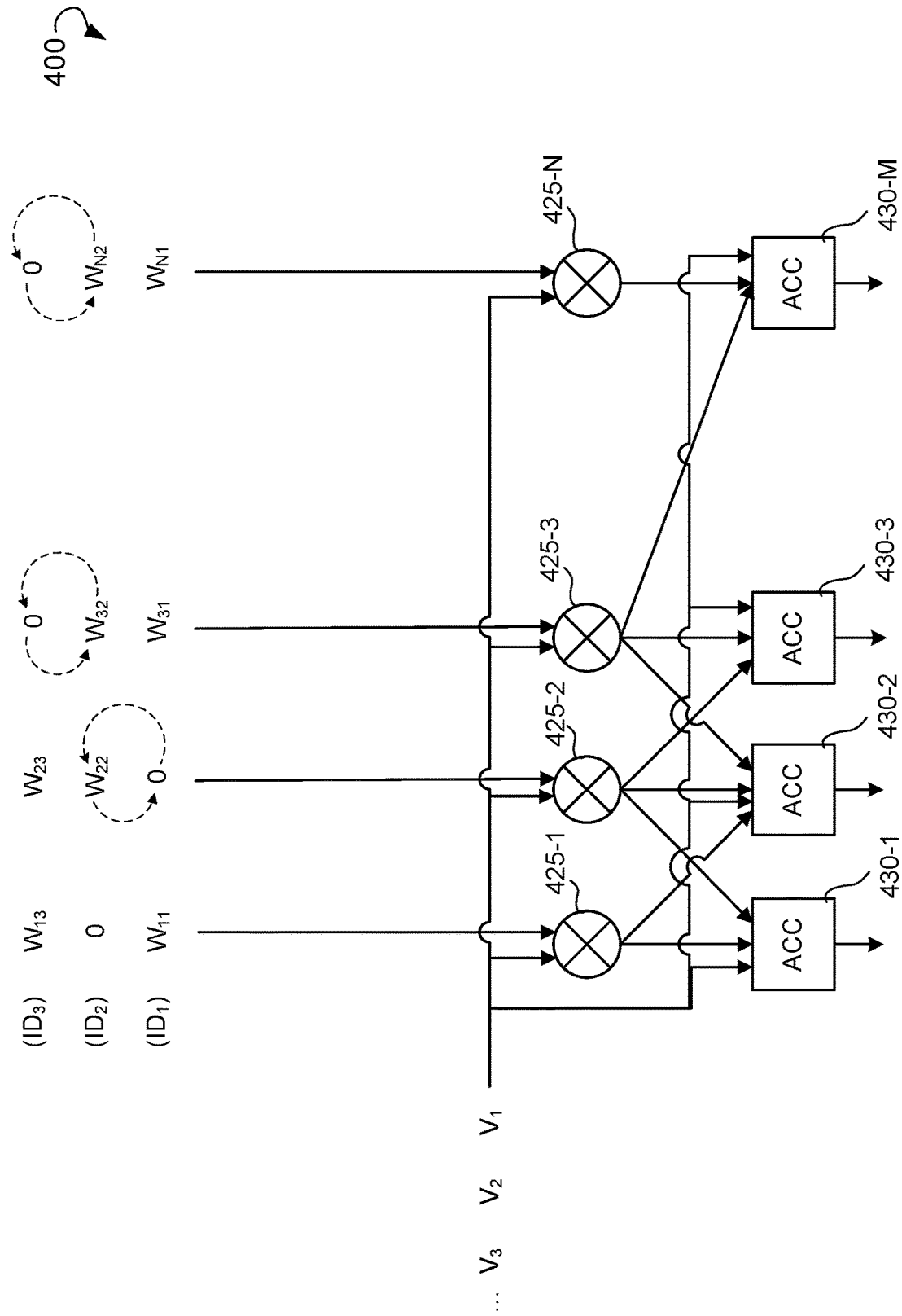
FIG. 4 is a block diagram showing an example system for calculating neurons of ANNs, according to an example embodiment.

FIG. 4 is a block diagram showing an example system 400 for calculating neurons of ANNs, according to an example embodiment. The system 400 includes multipliers 425-$i$ (i=1, . . . , N) and accumulator units 430-$j$ (j=1, . . . , M). The system may receive arrays of weights ($W_{1k}$, $W_{2k}$, . . . , $W_{Nk}$), (k=1, 2, . . . , K) and input values (V, $V_2$, . . . , $V_I$, . . . ). The multipliers 425-$i$ (i=1, . . . , N) perform multiplications of the weights in arrays of weights ($W_{1k}$, $W_{2k}$, . . . , $W_{Nk}$), (k=1, 2, . . . , K) and input values ($V_1$, $V_2$, . . . , $V_I$, . . . ). The accumulator units 430-$i$ (i=1, . . . , M) may accumulate results of multiplications by one or more multipliers 425-$i$ (i=1, . . . , N).

In some embodiments, the system 400 is carried out as a hardware unit. In these embodiments, the multiplications involving weights of a single array of weights ($W_{1k}$, $W_{2k}$, . . . , $W_{Nk}$), (k=1, 2, . . . , K) are performed in a single computational cycle of the system 400. If each of the arrays ($W_{1k}$, $W_{2k}$, . . . , $W_{Nk}$) (k=1, 2, . . . , K) includes both zero and non-zero weights as shown in FIG. 4, then the multiplication is executed for each of the arrays of weights without skipping any multiplication by zero.

It may be assumed that the arrays of weights ($W_{1k}$, $W_{2k}$, . . . , $W_{Nk}$), (k=1, 2, . . . , K) can be preliminarily modified in a such way that at least one modified array of weights will include only zero weights. Then multiplications involving the zero weights can be skipped in a single computational cycle of the system 400. In this case, number of computational cycles required by the system 400 to execute the multiplication of weights and input values and accumulations of results of multiplications can be reduced by at least one cycle.

Embodiments of the present disclosure allow modifying the arrays of weights ($W_{1k}$, $W_{2k}$, ..., $W_{Nk}$), (k=1, 2, ..., K) in a such way that computations of the ANN with modified arrays of weights require a smaller amount of operations than computations of the ANN with unmodified arrays of weights. It should be noted that this modification of the arrays of weights ($W_k$, $W_{2k}$, ..., $W_{Nk}$), (k=1, 2, ..., K) differs from the process of pruning of weights (shown in block 335 of FIG. 3) because the goal of pruning is to increase the number of zero weights in ANN, while modifications of the arrays of weights described in the present disclosure does not involve changing values of the weights. The modifications of arrays of weights described herein involve changing locations of weights within the arrays, changing an order of arrays of weights, extracting common parts in the arrays, and truncating arrays. However, modifications of the arrays described herein do not require changing values of the weights, for example, setting some of the weights to zeros. It should be noted that, unlike training and retraining of the ANN, the modifications of array of weights described herein do not require knowledge of input values for neurons and training sets for the ANN.

In some embodiments, the reduction in operations needed for computing the ANN can also be achieved when some of weights ($W_{1k}$, $W_{2k}$, $W_{Nk}$), (k=1, 2, ..., K) are equal to 1. When a weight $W_{jk}$ is equal to 1, the multiplication $W_{1k} \times V_l$ can be omitted, and, hence, only accumulation is needed. The value $V_l$ can be sent without performing multiplication by multipliers 425-$i$ (i=1, ..., N) directly to one or more accumulators 430-$i$ (i=1, ..., N). Thus, tracking weights equal to one and skipping multiplications involving these weights allow further reducing the amount of operations needed for computation of the ANN.

In another embodiment, the reduction of operations required for computations of the ANN can be also achieved by reducing an amount of "read" operations performed with the memories including memory 120. The reduction of the "read" operations can be achieved by positioning, after reading from the memory, the weight and storing the weight to different locations in arrays of weights ($W_{1k}$, $W_{2k}$, ..., $W_{Nk}$), (k=1, 2, ..., K), thereby allowing reduction of the amount of data used for the memories.

In some embodiments, arrays of weights ($W_{1k}$, $W_{2k}$, ..., $W_{Nk}$), (k=1, 2, ..., K) can be assigned identifiers ($ID_1$, $ID_2$, ..., $ID_k$), respectively. After the arrays of weights ($W_{1k}$, $W_{2k}$, ..., $W_{Nk}$), (k=1, 2, ..., K) are modified to obtain arrays of weights ($\tilde{W}_{1k}$, $\tilde{W}_{2k}$, ..., $\tilde{W}_{Nk}$), k=1, 2, ..., $\tilde{K}$), where $\tilde{N}$ can differ from N and $\tilde{K}$ can differ from K, each weight in the modified arrays ($\tilde{W}_{1k}$, $\tilde{W}_{2k}$, ..., $\tilde{W}_{Nk}$), (k=1, 2, ..., $\tilde{K}$) can be associated with the identifiers ($ID_1$, $ID_2$, ..., $ID_k$) to indicate to which of the original arrays of weights ($W_{1k}$, $W_{2k}$, ..., $W_{Nk}$), (k=1, 2, ..., K) the weight belongs. The identifiers ($ID_1$, $ID_2$, ..., $ID_k$) can be used to select, from the accumulators 430-$i$ (i=1, ..., M), an accumulator for accumulating a result of a multiplication between an input value and the weight.

The modifications of arrays of weights, generating identifiers for arrays of weights, assigning the identifiers to weights in the modified arrays of weights, and selecting, based on the identifiers, accumulators can be carried out by one or more processing units 110. The system 400 can be integrated into the system 100 as one of the processing units 110.

Figure 5:
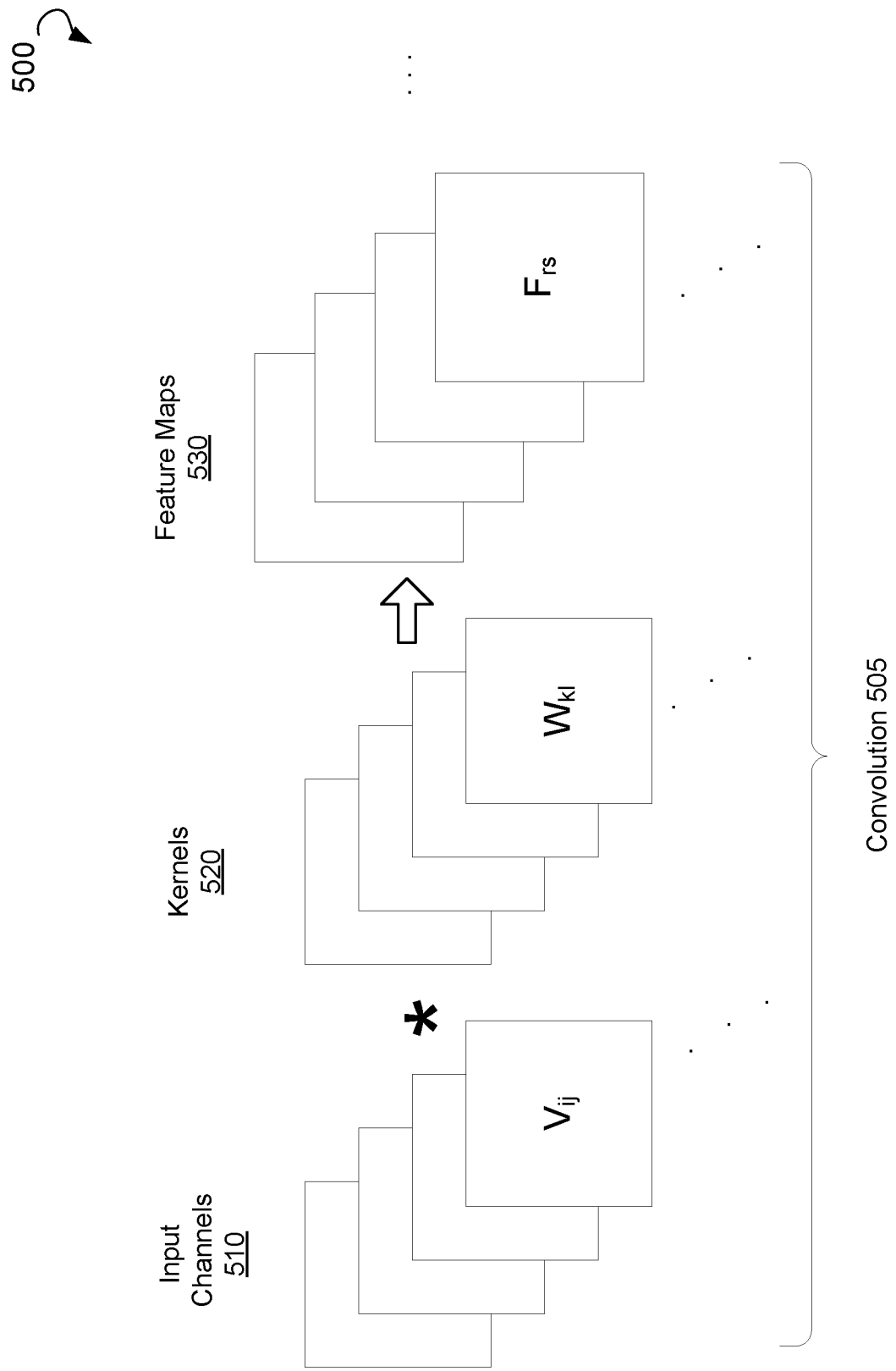
FIG. 5 is a block diagram showing an example structure of a convolutional neural network, according to some example embodiments.

FIG. 5 is a block diagram showing a structure 500 of a single convolution 505 of a CNN, according to some example embodiments. The structure 500 may include input channels 510 and kernels 520. The input channels 510 include input values to neurons of the CNN. The kernels 520 include weight $W_{kl}$ for the input values. The kernels 520 can be less in size than the input channels 510. The results of multiplications of the weights in kernels 520 and the input values in input channels 510 are stored in feature maps 530. Each result $F_{rs}$ is a sum of products of weights of one of kernels 520 and input values in a sliding window within one of the input channels 510, where the dimensions of the sliding window correspond to dimensions of the kernels 520.

The kernels 520 may include both zero and non-zero weights $W_{kl}$. Prior to computation of the convolution, the structure of the kernels 520 (which are two-dimensional arrays of weights) can be modified to balance number of zero weights $W_{kl}$ and number of the non-zero weights $W_{kl}$ across the series of the kernels 520. The balancing may allow to arrange some of weights $W'_{kl}$ across the series of the kernels 520 in a such way that the weights $W'_{kl}$ can be multiplied with corresponding input values $V_{ij}$ in a single computational cycle of a system for performing neuron computations, for example the system 400 shown in FIG. 4. This may allow to exclude the cycle involving multiplications of the zero weights $W'_{kl}$ from the computations of neurons, and by so reduce the amount of computations required to compute the results in feature maps 530 and, hence, computations of neurons of the CNN 500.

Figure 6:
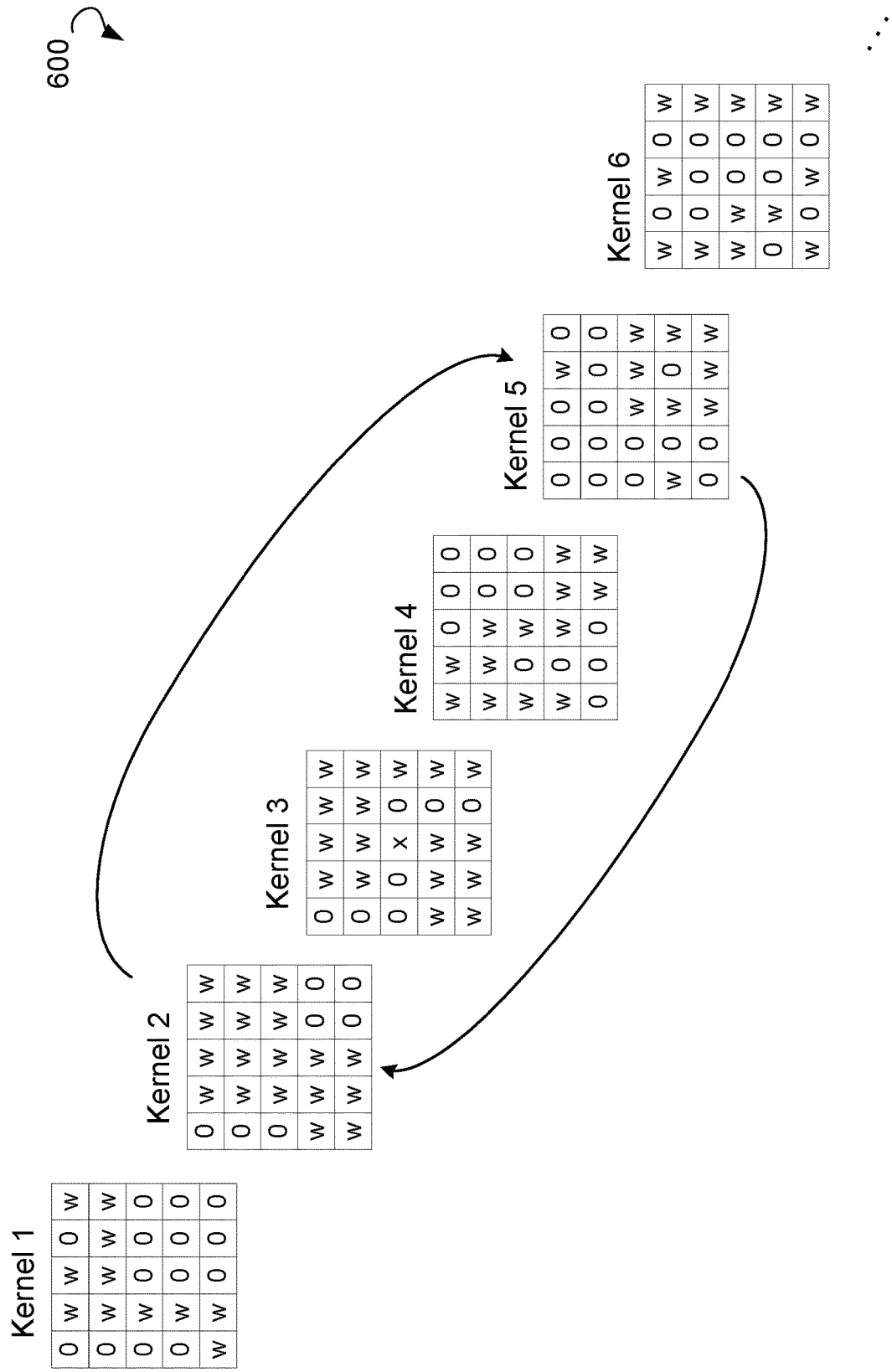
FIG. 6 is a block diagram showing an example modification of an ANN by reordering of kernels, according to an example embodiment.

FIG. 6 is a block diagram showing an example modification of an ANN 600 by reordering of kernels, according to an example embodiment. In example of FIG. 6, the ANN 600 includes kernels 1, 2, 3, 4, 5, and 6. The kernel 5 and kernel 2 can be changed in order to balance number of zero weights across the series of the kernels. In general, changing order in the kernels 1, 2, 3, 4, 5, and 6 can be carried out to decrease lengths of sequences of non-zero weights located at a same position in subsequent kernels in kernels 810 shown in FIG. 8. The reordering of the kernels 1, 2, 3, 4, 5, and 6 may result in colocation of zero weights at the same positions in the kernels 1, 2, 3, 4, 5, and 6, which may further allow skipping multiplications of weights located in the same positions in a single computational cycle in a system for computing calculating neurons of an ANN, for example, the system 400 of FIG. 4. For example, in kernel 1 and kernel 5, the same positions can be occupied by weights that are always zero and non-zero, and never non-zero simultaneously, thus allowing to perform operations related to kernel 1 and kernel 5 at the same time.

Figure 7:
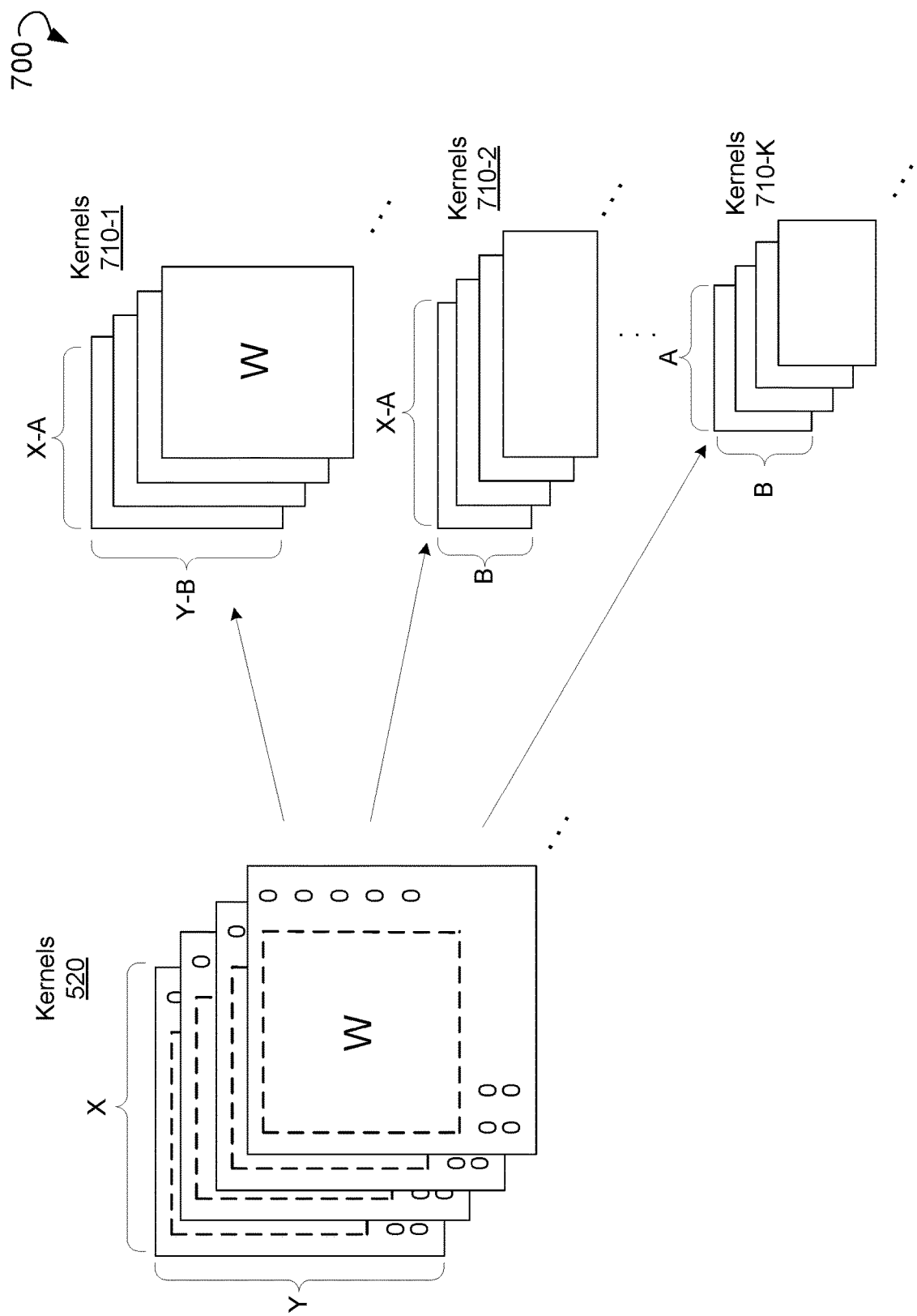
FIG. 7 is a block diagram showing an example modification of an ANN by splitting kernels, according to an example embodiment.

FIG. 7 is a block diagram showing an example modification of an ANN 700 by splitting kernels, according to an example embodiment. In example of FIG. 7, each of the kernels 520 has Y rows and X columns. Each of the kernels 520 includes submatrices of Y-B rows and X-A columns (A>0, B>0), where the submatrices include non-zero weights $W_{kl}$. Each of the kernels 520 includes submatrix of Y-B columns and A rows, where all weights $W_{kl}$ are zero. The kernels 520 can be split in kernels 710-1, kernels 710-2, and kernels 710-K. The kernels 710-1 has Y-B rows and X-A columns and include corresponding weights located in first Y-B rows and X-A columns of original kernels 520. The kernel 710-2 has B rows and first X-A columns and include corresponding weights located in the last B rows and the first X-A columns of original kernels 520. The kernels 710-K have B rows and A columns and include corresponding weights located in the last B rows and the last A columns of the original kernels 520. The weights located in the first Y-B rows and the last A columns of the original kernels 520 can be excluded from computations of ANN 700. The computations of ANN 700 can further proceed with the kernels 710-1, 710-2, and 710-K only.

Figure 8:
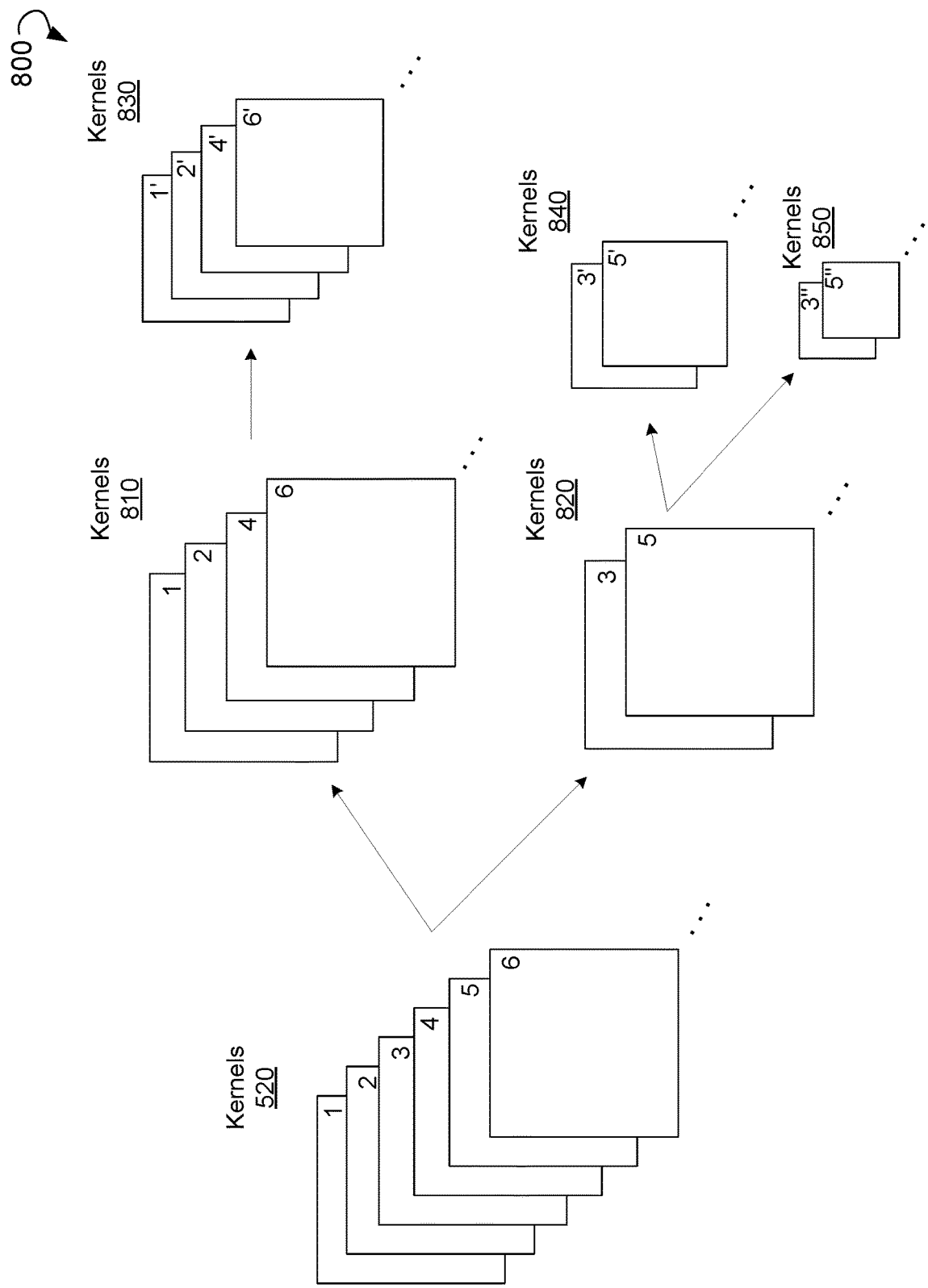
FIG. 8 is a block diagram showing an example complex modification of an ANN, according to an example embodiment.

FIG. 8 is a block diagram showing an example complex modification of an ANN 800, according to an example embodiment. In example of FIG. 8, the ANN 800 includes kernels 520. The kernels 520 includes a series of kernels 1, 2, 3, 4, 5, and 6. The modification of the kernels 520 may start with dividing the kernels 520 into the kernels 810 and the kernels 820. The kernels 810 may include a series of kernels 1, 2, 4, and 6 of the original kernels 520. The kernels 820 may include a series of kernels 3 and 5 of the original kernels 520.

The separation of the kernels 520 into kernels 810 and kernels 820 can be performed, for example, to collocate zero elements at the same positions in subsequent kernels. The kernels 810 can be then reduced in size to obtain kernels 830. The kernels 830 may include a series of kernels 1', 2', 4', and 6'. Zero weights collocated in the same positions in series of kernels 810 may not be included in the kernels 830.

The kernels 820 can be then split into kernels 840 and kernels 850. The kernels 840 may include series of kernels 3' and 5'. The kernels 840 may include series of kernels 3" and 5". The kernels 3', 5', 3", and 5" are smaller in size than the kernels 3 and 5. The kernels 3', 5', 3", and 5" can include submatrices of the kernels 3 and 5. Some of zero weights of the kernels 3 and 5 may not be included in the kernels 3', 5', 3", and 5".

The computation of neurons of ANN 800 can then proceed using the kernels 830, 840, and 850. The computation of ANN 800 using the kernels 830, 840, and 850 may require less multiplications than the computation of ANN 800 using the original kernels 520.

Figure 9:
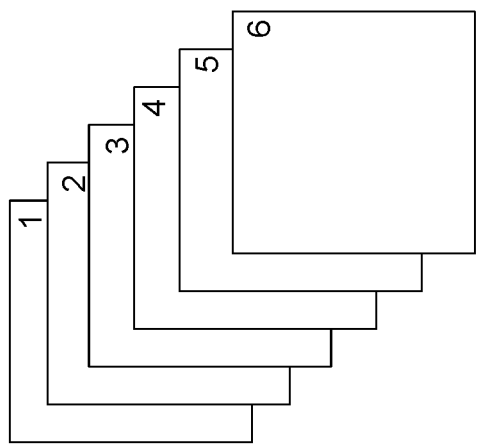
FIG. 9 is a block diagram showing an example modification of an ANN by inserting kernels, according to an example embodiment.

FIG. 9 is a block diagram showing an example modification of an ANN 900 by inserting kernels, according to an example embodiment. In example of FIG. 9, the ANN 900 includes a series of kernels 520. The kernels 520 include kernels 1, 2, 3, 4, 5, and 6. The series of kernels 520 are modified to insert kernel 2' between original kernels 2 and 3 and kernel 4' between original kernels 4 and 5. The kernels 2' and 4' may include only zero weights. The kernels 2 and 2' resulting from inserting kernel 2' can be equivalent to the original kernel 2. The resulting kernels 910 may include a series of kernels 1, 2, 2', 3, 4, 4', 5, and 6, where number of zero weights and number of non-zero weights are balanced across the series. Balancing of numbers of zero and non-zero weights across the kernels may increase times needed for processing of some streams formed by weights of kernels 520. However, the balancing of numbers of the zero and non-zero weights across the kernels 910 may reduce total time for processing of all streams of weights of the kernels 520 in ANN 900. For example, kernel 1 and modified kernel 2 on one side and kernel 2' and kernel 3 can be processed at the same time, resulting in 2 sets of operations instead of 3 sets of operations required by processing original kernels 1, 2, and 3.

Figure 10:
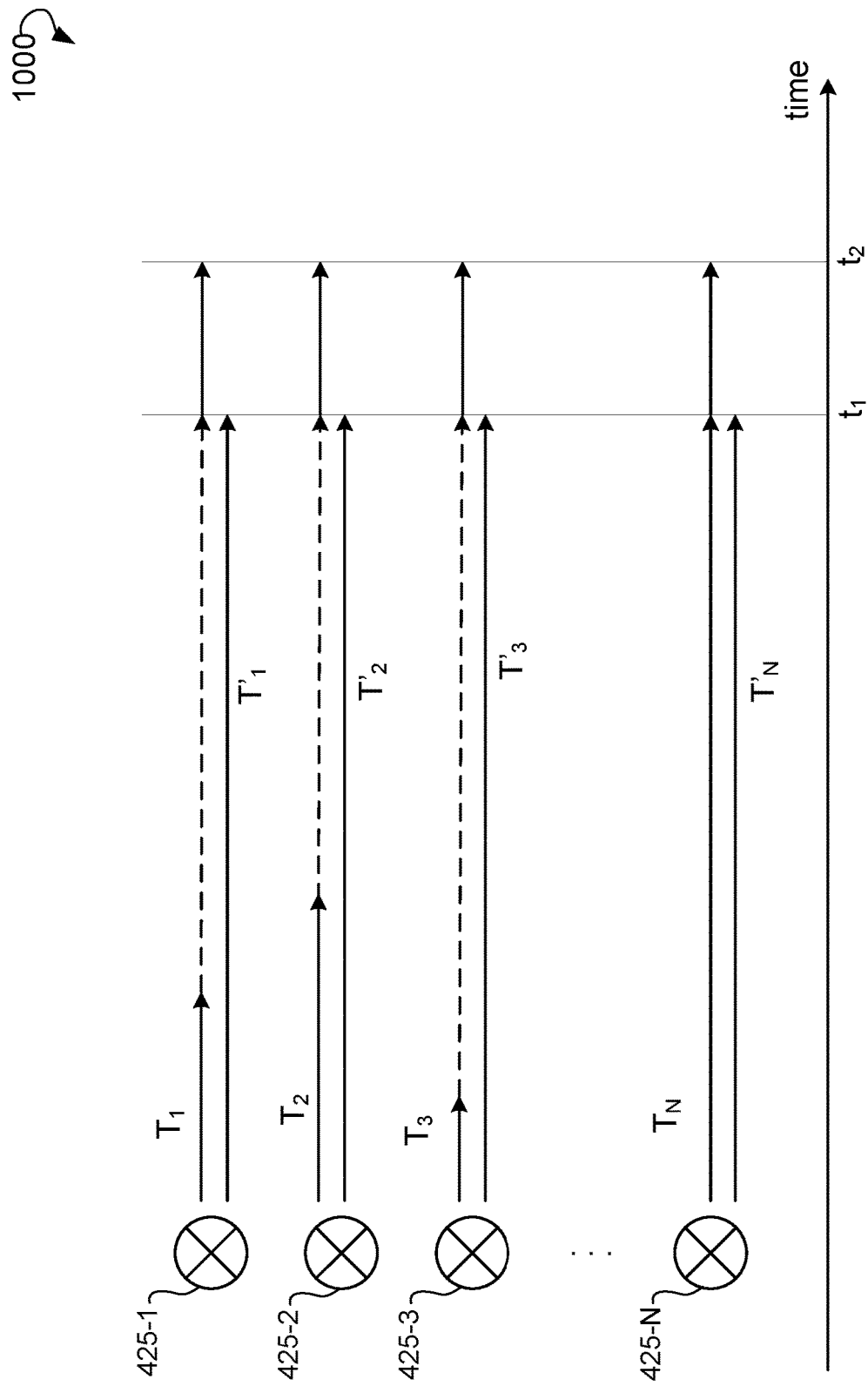
FIG. 10 is a block diagram showing time of computations of neurons of an ANN, according to an example embodiment.

FIG. 10 is a block diagram 1000 showing time of computations of neurons of the ANN 900, according to an example embodiment. The diagram 1000 includes multipliers 425-$i$ ($i$=1, 2, . . . , N) that process streams of weights of the ANN 900. The times $T_1$, $T_2$, $T_3$, . . . , $T_N$ are times of processing streams of weights of kernels 520 by the multipliers 425-$i$ ($i$=1, 2, . . . , N) assuming that multipliers 425-$i$ ($i$=1, 2, . . . , N) do not perform multiplications involving zero weights and number of zero weights is not balanced across the series of kernels 520. Unbalanced number of zero weights across the series of kernels 520 may result in situation when, for example, the multipliers 425-$i$ ($i$=1, 2, . . . , N−1) have finished processing streams of weights, while the multiplier 425-N continues processing a stream designated to the multiplier 425-N. When the multiplier 425-N has finished processing, an extra time between $t_1$ and $t_2$ will be required to check if all the streams of weights are processed and restart the processing for the next series of streams of weights.

The times $T'_1$, $T'_2$, $T'_3$, . . . , $T'_N$ are times of processing streams of weights of kernels 910 by the multipliers 425-$i$ ($i$=1, 2, . . . , N) assuming that multipliers 425-$i$ ($i$=1, 2, . . . , N) do not perform multiplications involving zero weights and numbers of zero weights is not balanced across the series of kernels 910. Because the number of zero weights is balanced across the kernels 910, the multipliers 425-$i$ ($i$=1, 2, . . . , N) may finish processing of the stream streams substantially at the same time. In this situation, even there may be no decrease of time of processing for individual streams, the total time of processing the streams can be shorter because checks if all the streams are finished can be done substantially simultaneously for all the multipliers 425-$i$ ($i$=1, 2, . . . , N).

Figure 11:
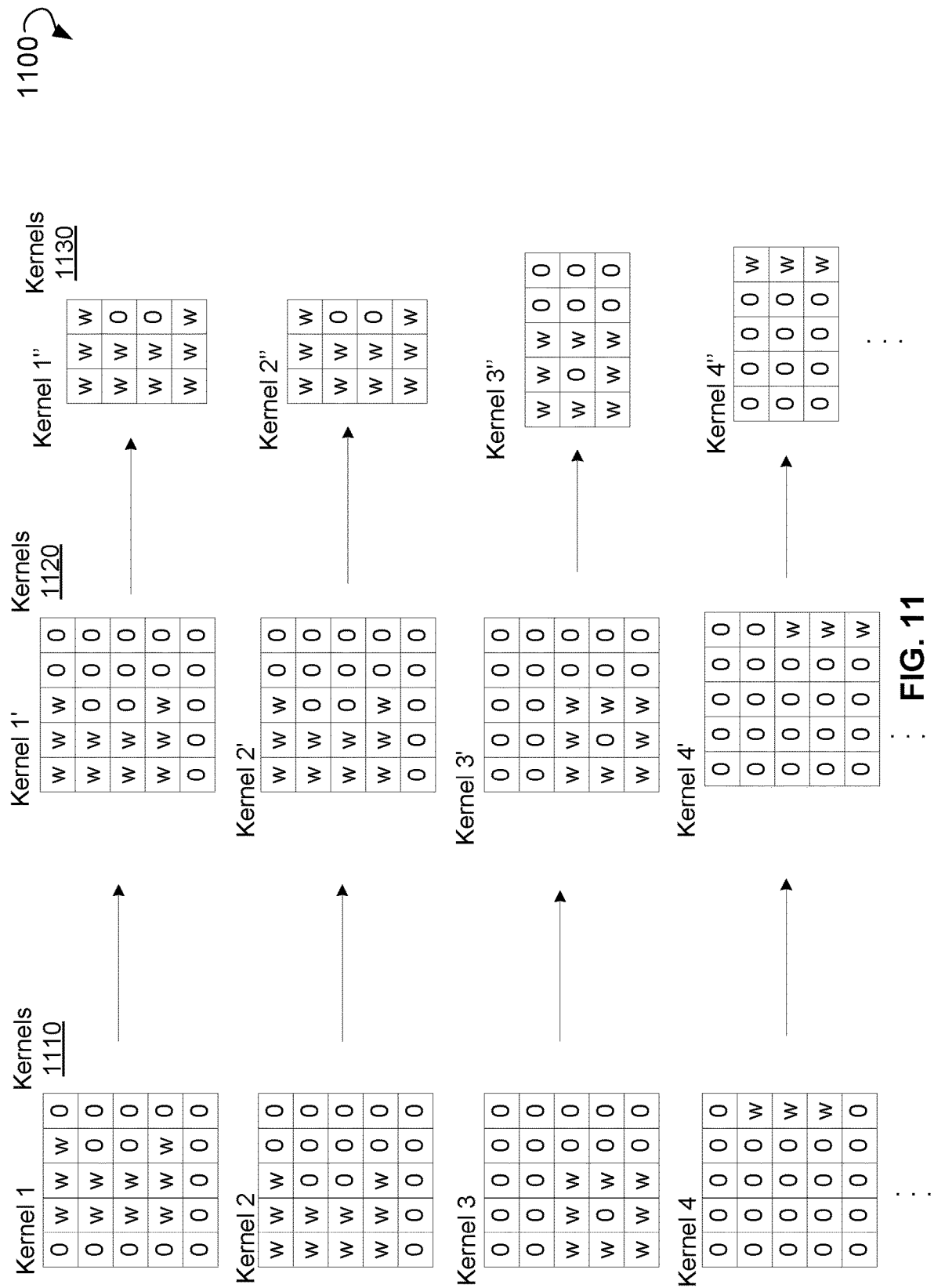
FIG. 11 is a block diagram showing an example modification of an ANN by reducing size of kernels, according to an example embodiment.

FIG. 11 is a block diagram showing an example modification of an ANN 1100 by reducing size of kernels, according to an example embodiment. In the example of FIG. 11, the ANN 1100 may include kernels 1110. The kernels 1110 may include a series of kernels 1, 2, 3, and 4. The kernels 1110 can be modified to collocate columns and/or rows including zero weights. The results of modification of kernels 1110 are kernels 1120 including a series of kernels 1', 2', 3', and 4'. The kernels 1120 can be reduced in size by truncating rows and/or columns including only zero weights. The results of modification of the kernels 1120 are kernels 1130. The kernels 1130 include kernel 1", 2", 3", and 4". The kernel 3" and 4" can be further reduced in size by truncated columns including only zero weights. As result, computations of ANN 1100 using the kernels 1130 may require less multiplications than computation of ANN 1100 using the original kernels 1110.

Figure 12:
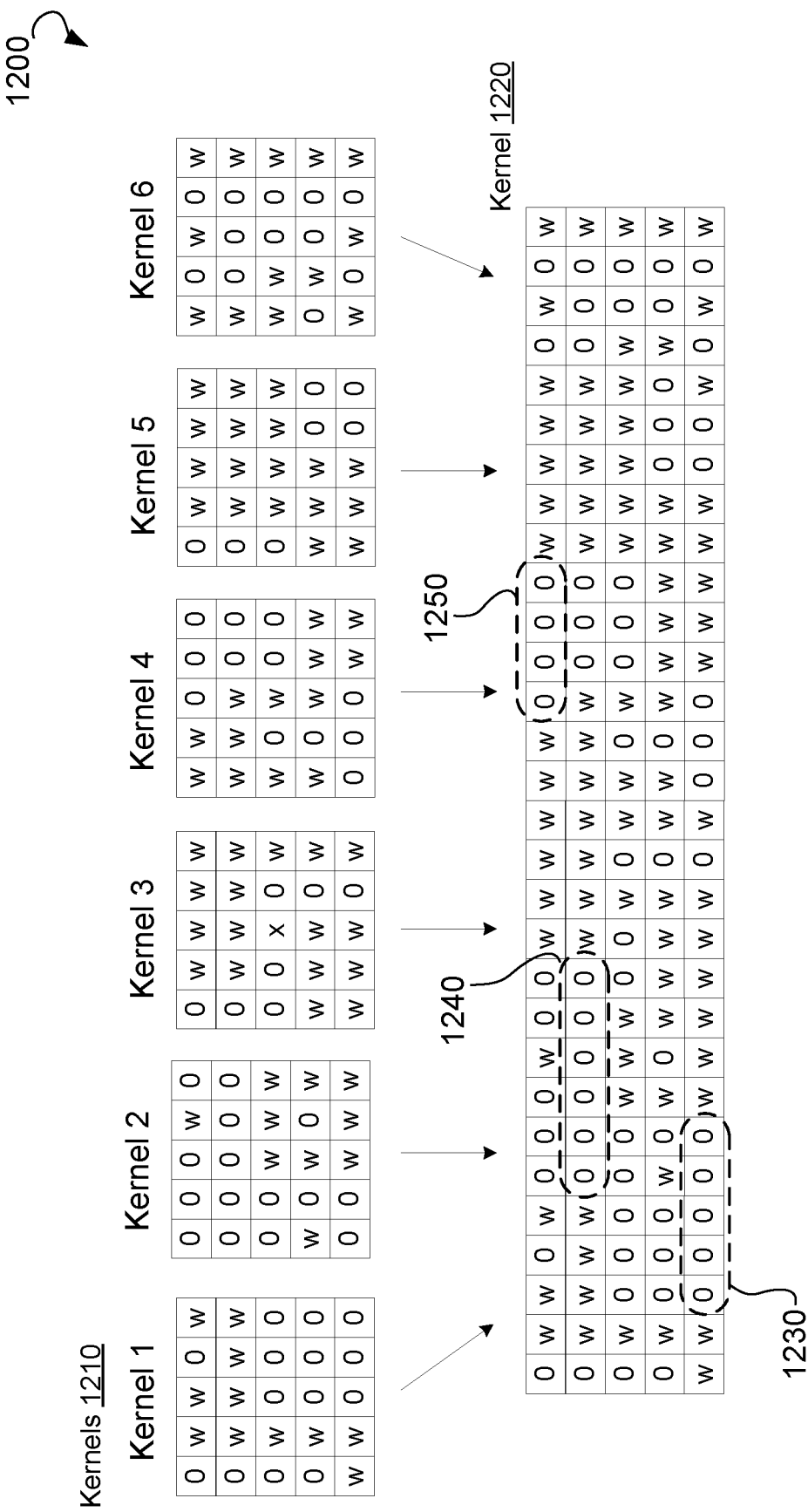
FIG. 12 is a block diagram showing an example modification of an ANN by aggregating kernels, according to an example embodiment.

FIG. 12 is a block diagram showing an example modification of an ANN 1200 by aggregating kernels, according to an example embodiment. In example of FIG. 12, the ANN 1200 includes kernels 1210. The kernels 1210 include a series of kernels 1, 2, 3, 4, 5, and 6. The kernels 1210 can be aggregated to for into a single kernel 1220. The kernel 1220 incudes sequences of weights 1230, 1240, and 1250. The sequence 1230 includes zero weights of original kernels 1 and 2. The sequence 1240 includes zero weights of the original kernels 2 and 3. The sequence 1250 includes zero weights of the original kernels 4 and 5. The multiplication of the weights in the sequences 1230, 1240, and 1250 each can be skipped in computational cycles of a system for calculating neurons of an ANN, for example, the system 400 of FIG. 4. The original kernels 1210 may not allow to skip the zero weights of the sequences 1230, 1240, and 1250 if, for example, the system 400 requires mutual multiplications involving at least 4 weights. As result, computation of ANN 1200 using the kernel 1220 may require less multiplications then computations of ANN 1200 using the original kernels 1210.

Figure 13:
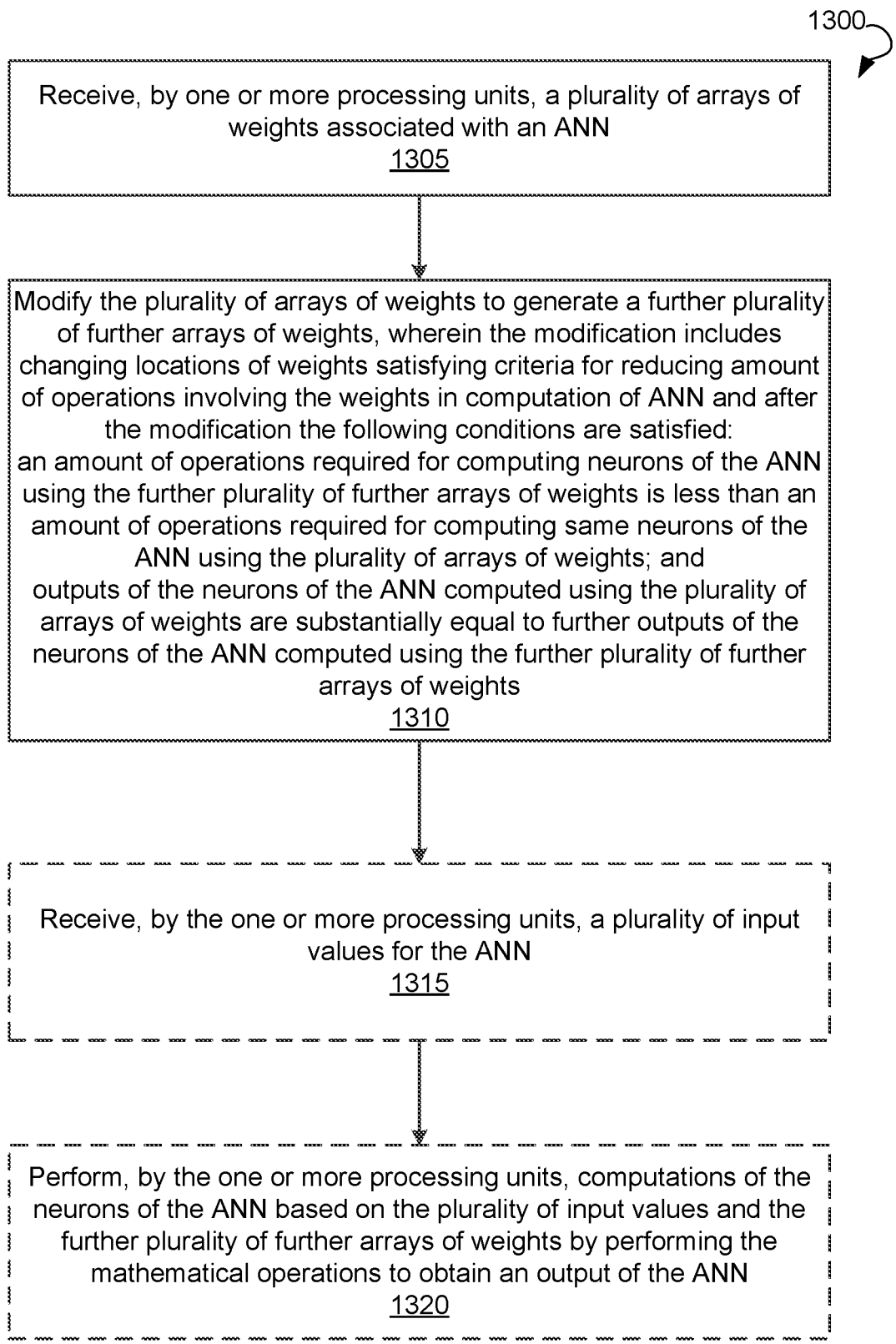
FIG. 13 is a flow chart showing steps of a method for modifying a structure of an ANN, according to some example embodiments.

FIG. 13 is a flow chart showing steps of a method 1300 for modifying a structure of artificial neural networks, according to some example embodiments. The method 1300 may be implemented by the system 100 shown in FIG. 1.

The method 1300 may commence in block 1305 with receiving, by one or more processing units, a plurality of arrays of weights associated with the ANN.

In block 1310, the method 1300 may include modifying, by the one or more processing units, the plurality of arrays of weights to generate a further plurality of further arrays of weights. The modification may change locations of weights. The weights with the changed locations may satisfy criteria for reducing operations required for computation of ANN. After the modification the following conditions are satisfied: 1) an amount of operations required for computing neurons of the ANN using the further plurality of further arrays of weights is less than an amount of operations required for computing same neurons of the ANN using the plurality of arrays of weights; and 2) outputs of the neurons of the ANN computed using the plurality of arrays of weights are substantially equal to further outputs of the neurons of the ANN using the further plurality of further arrays of weights.

The further plurality of the further arrays of weights include a series of weights such that: 1) the operations involving the series of weights and corresponding input values to the neurons are performed in a single computational cycle of computation of the ANN; and 2) each weight of the series of weights satisfies criteria for reducing the operations involving the weight in the computation of ANN.

The plurality of arrays of weights is modified to decrease lengths of sequences of zero weights located at the same position in subsequent arrays of weights in the plurality of arrays of weights. Alternatively, the plurality of arrays of weights is modified to decrease lengths of sequences of non-zero weights located at the same position in subsequent arrays of weights in the plurality of arrays of weights.

The modification of the plurality of arrays of weights may include changing an order of arrays in the plurality of arrays of weights. The modification of the plurality of arrays of weights may include splitting an array of the plurality of arrays of weights into a first array and at least one second array, where a size of the first array is less than a size of the array, and where the further plurality of further arrays of weights includes the first array. The modification of the plurality of arrays of weights may include inserting at least one additional array of values between two arrays in the plurality of arrays of weights.

In block 1315, the method 1300 may include receiving, by the one or more processing units, a plurality of input values for the ANN.

In block 1320, the method 1300 may include performing, by the one or more processing units, computations of the neurons of the ANN based on the plurality of input values and the further plurality of further arrays of weights by performing the operations to obtain an output of the ANN.

Figure 14:
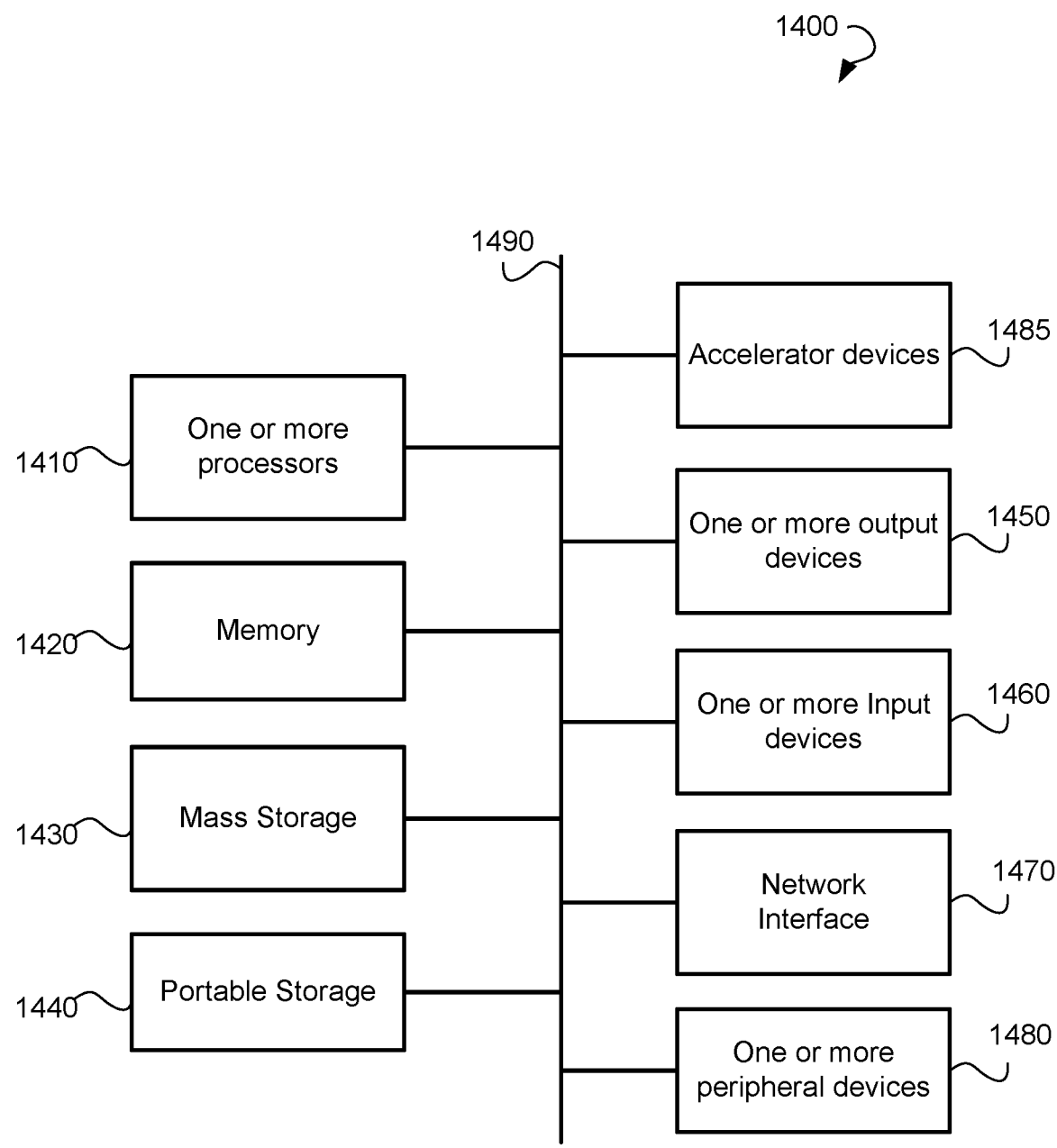
FIG. 14 shows a computing system that can be used to implement embodiments of the disclosed technology.

FIG. 14 illustrates an example computing system 1400 that may be used to implement embodiments described herein. The example computing system 1400 of FIG. 14 may include one or more processors 1410 and memory 1420. Memory 1420 may store, in part, instructions and data for execution by the one or more processors 1410. Memory 1420 can store the executable code when the exemplary computing system 1400 is in operation. The one or more processors 1410 may include internal accelerators like a GPU, a FPGA, or similar accelerators that may be suitable for use with embodiments described herein. The memory 1420 may include internal accelerators like a GPU, a FPGA, or similar accelerators that may be suitable for use with embodiments described herein. The example computing system 1400 of FIG. 14 may further include a mass storage 1430, portable storage 1440, one or more output devices 1450, one or more input devices 1460, a network interface 1470, and one or more peripheral devices 1480.

The components shown in FIG. 14 are depicted as being connected via a single bus 1490. The components may be connected through one or more data transport means. The one or more processors 1410 and memory 1420 may be connected via a local microprocessor bus, and the mass storage 1430, one or more peripheral devices 1480, portable storage 1440, and network interface 1470 may be connected via one or more input/output buses.

Mass storage 1430, which may be implemented with a magnetic disk drive, an optical disk drive, or a solid state drive (SSD), is a non-volatile storage device for storing data and instructions for use by a magnetic disk, an optical disk drive, or SSD, which in turn may be used by one or more processors 1410. Mass storage 1430 can store the system software for implementing embodiments described herein for purposes of loading that software into memory 1420. The mass storage 1430 may also include internal accelerators like a GPU, a FPGA, or similar accelerators that may be suitable for use with embodiments described herein.

Portable storage 1440 may operate in conjunction with a portable non-volatile storage medium, such as a compact disk (CD) or digital video disc (DVD), to input and output data and code to and from the computing system 1400 of FIG. 14. The system software for implementing embodiments described herein may be stored on such a portable medium and input to the computing system 1400 via the portable storage 1440.

One or more input devices 1460 provide a portion of a user interface. The one or more input devices 1460 may include an alphanumeric keypad, such as a keyboard, for inputting alphanumeric and other information, or a pointing device, such as a mouse, a trackball, a stylus, or cursor direction keys. Additionally, the computing system 1400 as shown in FIG. 14 includes one or more output devices 1450. Suitable one or more output devices 1450 include speakers, printers, network interfaces, and monitors.

Network interface 1470 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 1470 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a universal serial bus.

One or more peripheral devices 1480 may include any type of computer support device to add additional functionality to the computing system. The one or more peripheral devices 1480 may include a modem or a router.

The example computing system 1400 of FIG. 14 may also include one or more accelerator devices 1485. The accelerator devices 1485 may include PCIe-form-factor boards or storage-form-factor boards, or any electronic board equipped with a specific electronic component like a GPU, a Neural Processing Unit, a Multi-CPU component, a FPGA component, or similar accelerating electronic or photonic components that may be suitable for use with embodiments described herein.

The components contained in the exemplary computing system 1400 of FIG. 14 are those typically found in computing systems that may be suitable for use with embodiments described herein and are intended to represent a broad category of such computer components that are well known in the art. Thus, the exemplary computing system 1400 of FIG. 14 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to the system RAM, from which a CPU retrieves and executes the instructions. The instructions received by the system RAM can optionally be stored on a fixed disk either before or after execution by a CPU. The instructions or data may not be used by the CPU but be accessed in writing or reading from the other devices without having the CPU directing them.

Thus, systems and methods for modifying a structure of an ANN are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for modifying a structure of an artificial neural network (ANN), the system comprising one or more processing units configured to:
receive a plurality of arrays of weights associated with the ANN, wherein weights of an array of weights of the plurality of arrays of weights are to be processed in parallel by a plurality of multipliers;
modify the plurality of arrays of weights to generate a further plurality of further arrays of weights, wherein the modification includes changing locations of weights satisfying criteria for reducing a number of operations involving the weights in a computation of the ANN while keeping values of the weights unchanged and after the modification the following conditions are satisfied:
a number of operations required by the plurality of multipliers for computing neurons of the ANN using the further plurality of further arrays of weights is less than a number of operations required by the plurality of multipliers for computing same neurons of the ANN using the plurality of arrays of weights; and
outputs of the neurons of the ANN computed using the plurality of arrays of weights are substantially equal to further outputs of the neurons of the ANN computed using the further plurality of further arrays of weights; and
transmit the further plurality of further arrays of weights to the plurality of multipliers, wherein the plurality of multipliers computes the outputs of the ANN.

2. The system of claim 1, wherein the one or more processing units are configured to:
receive a plurality of input values for the ANN; and
perform computations of the neurons of the ANN based on the plurality of input values and the further plurality of further arrays of weights by performing the operations to obtain an output of the ANN.

3. The system of claim 2, wherein the further plurality of the further arrays of weights include a series of weights such that:
each weight of the series of weights satisfies criteria for reducing the number of operations involving the weight from the computation of the ANN; and
the operations involving the series of weights and corresponding input values to the neurons are performed by the plurality of multipliers in a single computational cycle of computation of the ANN.

4. The system of claim 3, wherein the one or more processors are configured to determine that the weight satisfies the criteria by comparing the weight to one or more pre-determined reference values.

5. The system of claim 4, wherein the one or more pre-determined reference values includes one of zero or one.

6. The system of claim 1, wherein the operations include multiplication.

7. The system of claim 1, wherein the modifying the plurality of arrays of weights includes changing an order of arrays in the plurality of arrays of weights.

8. The system of claim 1, wherein the modifying the plurality of arrays of weights includes inserting at least one additional array of values between two arrays in the plurality of arrays of weights.

9. The system of claim 1, wherein the modifying the plurality of arrays of weights includes splitting an array of the plurality of arrays of weights into a first array and at least one second array, wherein a size of the first array is less than a size of the array, and wherein the further plurality of further arrays of weights includes the first array.

10. The system of claim 1, wherein the modifying the plurality of arrays of weights includes:
determining that each of the plurality of arrays of weights includes a subset of weights, wherein each of the subset of weights satisfies a criterion for skipping the weights from computation of the neurons of the ANN; and
modifying each of the plurality of arrays of weights by removing the subset of weights and realigning the rest of the weights in all of the plurality of arrays.

11. The system of claim 1, wherein the plurality of arrays of weights is modified to decrease lengths of one of the following:
sequences of zero weights located at a same position in subsequent arrays of weights in the plurality of arrays of weights; or
sequences of non-zero weights located at the same position in subsequent arrays of weights in the plurality of arrays of weights.

12. The system of claim 1, wherein the one or more processing units are configured to:
generate an identifier related to an array of weights of the plurality of arrays of weights; and
associate the identifier to a weight from an array of weights in the further plurality of further arrays of weights.

13. The system of claim 12, wherein the one or more processing units are configured to identify, based on the identifier, an accumulator for accumulating a result of a multiplication between an input value and the weight of the array of the weights in the further plurality of arrays of weights.

14. The system of claim 1, wherein the plurality of arrays includes kernels for calculating feature maps in a convolution.

15. A method for modifying structure of an artificial neural network (ANN), the method comprising:
receiving, by one or more processing units, a plurality of arrays of weights associated with the ANN, wherein weights of an array of weights of the plurality of arrays of weights are to be processed in parallel by a plurality of multipliers;
modifying, by the one or more processing units, the plurality of arrays of weights to generate a further plurality of further arrays of weights, wherein the modification includes changing the locations of weights satisfying criteria for reducing a number of operations involving the weights in a computation of the ANN while keeping values of the weights unchanged and after the modification the following conditions are satisfied:
a number of operations required by the plurality of multipliers for computing neurons of the ANN using the further plurality of further arrays of weights is less than a number of operations required by the plurality of multipliers for computing same neurons of the ANN using the plurality of arrays of weights; and
outputs of the neurons of the ANN computed using the plurality of arrays of weights are substantially equal to further outputs of the neurons of the ANN using the further plurality of further arrays of weights; and
transmitting, by the one or more processing units, the further plurality of further arrays of weights to the plurality of multipliers, wherein the plurality of multipliers computes the outputs of the ANN.

16. The method of claim 15, further comprising:
receiving, by the one or more processing units, a plurality of input values for the ANN; and
performing, by the one or more processing units, computations of the neurons of the ANN based on the plurality of input values and the further plurality of further arrays of weights by performing the operations to obtain an output of the ANN.

17. The method of claim 16, wherein the further plurality of the further arrays of weights include a series of weights such that:
each weight of the series of weights satisfies the criteria for reducing the number of operations involving the weight from the computation of the ANN; and
the operations involving the series of weights and corresponding input values to the neurons are performed by the plurality of multipliers in a single computational cycle of computation of the ANN.

18. The method of claim 15, wherein the plurality of arrays of weights is modified to decrease lengths of one of the following:
sequences of zero weights located at the same position in subsequent arrays of weights in the plurality of arrays of weights; or
sequences of non-zero weights located at the same position in subsequent arrays of weights in the plurality of arrays of weights.

19. The method of claim 15, wherein the modifying the plurality of arrays of weights includes one or more of the following:
changing an order of arrays in the plurality of arrays of weights;
splitting an array of the plurality of arrays of weights into a first array and at least one second array, wherein a size of the first array is less than a size of the array, and wherein the further plurality of further arrays of weights includes the first array; and
inserting at least one additional array of values between two arrays in the plurality of arrays of weights.

20. A system for modifying structure of an artificial neural network (ANN), the system comprising one or more processing units configured to:
receive a plurality of arrays of weights associated with the ANN, wherein weights of an array of weights of the plurality of arrays of weights are to be processed in parallel by a plurality of multipliers;
modify the plurality of arrays of weights to generate a further plurality of further arrays of weights, wherein the modification includes modifying the locations of weights satisfying criteria for reducing a number of operations involving the weights in computation of the ANN while keeping values of the weights unchanged and after the modification the following conditions are satisfied:
a number of operations required by the plurality of multipliers for computing neurons of the ANN using the further plurality of further arrays of weights is less than a number of operations required by the plurality of multipliers for computing same neurons of the ANN using the plurality of arrays of weights; and
outputs of the neurons of the ANN computed using the plurality of arrays of weights are substantially equal to further outputs of the neurons of the ANN using the further plurality of further arrays of weights;
receive a plurality of input values for the ANN; and transmit the plurality of input values and the further plurality of further arrays of weights to the plurality of multipliers, wherein the plurality of multipliers computes the outputs of the ANN.

\* \* \* \* \*